US012531349B2

(12) United States Patent
Yang

(10) Patent No.: US 12,531,349 B2
(45) Date of Patent: Jan. 20, 2026

(54) ANTENNA AND ELECTRONIC DEVICE

(71) Applicants: Beijing BOE Sensor Technology Co., Ltd., Beijing (CN); BOE TECHNOLOGY GROUP CO., LTD., Beijing (CN)

(72) Inventor: Shuo Yang, Beijing (CN)

(73) Assignees: Beijing BOE Sensor Technology Co., Ltd., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 102 days.

(21) Appl. No.: 18/701,241

(22) PCT Filed: Apr. 7, 2023

(86) PCT No.: PCT/CN2023/086960
§ 371 (c)(1),
(2) Date: Apr. 14, 2024

(87) PCT Pub. No.: WO2024/207451
PCT Pub. Date: Oct. 10, 2024

(65) Prior Publication Data
US 2025/0260175 A1 Aug. 14, 2025

(51) Int. Cl.
*H01Q 21/06* (2006.01)
*H01Q 1/38* (2006.01)

(52) U.S. Cl.
CPC ............. *H01Q 21/061* (2013.01); *H01Q 1/38* (2013.01)

(58) Field of Classification Search
CPC .......... H01Q 21/061; H01Q 1/38; H01Q 1/42; H01Q 21/08
See application file for complete search history.

(56) References Cited

U.S. PATENT DOCUMENTS 12,166,292 B2 * 12/2024 Feng ...................... H01Q 21/08
2010/0060526 A1 3/2010 Cheng
(Continued)

FOREIGN PATENT DOCUMENTS

CN 1564374 A 1/2005
CN 2802743 Y 8/2006
(Continued)

OTHER PUBLICATIONS

USPTO, U.S. Appl. No. 17/772,841, First Office Action, issued Mar. 28, 2024.

(Continued)

*Primary Examiner* — Seung H Lee
(74) *Attorney, Agent, or Firm* — HOUTTEMAN LAW LLC

(57) ABSTRACT

An antenna includes: a first substrate and a second substrate. The first substrate includes: a first dielectric substrate, a first reference electrode layer, a first radiation part, and a feeder group. The first dielectric substrate includes a main substrate and a side substrate, the feeder group includes at least one feeder, in each of which, each feeder is electrically connected to one first radiation part, and different feeders are electrically connected to different first radiation parts. The second substrate includes: a second dielectric substrate, a second reference electrode layer, and a feed structure. The feed structure corresponds to the feeder group, and for corresponding feed structure and feeder group, each first feed port in the feed structure is electrically connected to one feeder in the feeder group through a first connection via which runs through at least the side substrate, the second reference electrode layer, and the second dielectric substrate.

20 Claims, 9 Drawing Sheets

(56) References Cited

U.S. PATENT DOCUMENTS

| | | | | |
|---|---|---|---|---|
| 2013/0187830 | A1 | 7/2013 | Warnick et al. | |
| 2019/0363452 | A1 | 11/2019 | Ting et al. | |
| 2020/0176863 | A1 | 6/2020 | Luna et al. | |
| 2024/0297440 | A1* | 9/2024 | Jin | H01Q 21/065 |

FOREIGN PATENT DOCUMENTS

| | | | | |
|---|---|---|---|---|
| CN | 203521620 | U | 4/2014 | |
| CN | 104160554 | A | 11/2014 | |
| CN | 206340668 | U | 7/2017 | |
| CN | 110011054 | A | 7/2019 | |
| CN | 209786182 | U | 12/2019 | |
| CN | 110676577 | A * | 1/2020 | H01Q 19/104 |
| CN | 110824735 | A | 2/2020 | |
| CN | 111007952 | A | 4/2020 | |
| CN | 111063996 | A | 4/2020 | |
| CN | 111129749 | A | 5/2020 | |
| CN | 210720940 | U | 6/2020 | |
| CN | 111725624 | A | 9/2020 | |
| CN | 114374078 | A | 4/2022 | |
| CN | 114824804 | A | 7/2022 | |
| CN | 115917870 | A | 4/2023 | |
| EP | 1411589 | A2 | 4/2004 | |
| WO | WO2013092821 | A1 | 6/2013 | |
| WO | WO2021261630 | A1 | 12/2021 | |
| WO | WO2022088714 | A1 | 5/2022 | |

OTHER PUBLICATIONS

USPTO, U.S. Appl. No. 17/772,841, Notice of Allowance, issued Aug. 8, 2024.

European Patent Office, EP21884455.3, Extended European search report (EESR) issued on May 24, 2024.

European Patent Office, EP21884455.3, Partial Supplementary European Search Report (PESR) issued Dec. 22, 2023.

WIPO, PCT/CN2021/102350 International Search Report (ISR), issued Sep. 7, 2021.

China Patent Office, CN2021800016563 the First Office Action, issued on Sep. 15, 2023, English translation.

* cited by examiner

ANTENNA AND ELECTRONIC DEVICE

CROSS-REFERENCE TO RELATED APPLICATION

This is a National Phase Application filed under 35 U.S.C. 371 as a national stage of PCT/CN2023/086960, filed on Apr. 7, 2023, the content of which is hereby incorporated by reference in its entirety.

TECHNICAL FIELD

The present disclosure belongs to the field of communication technology, and specifically relates to an antenna and an electronic device.

BACKGROUND

With the continuous development of the mobile communication technology, additional functional attributes of glazing are increasingly remarkable. Among them, the fusion application of antenna and glazing has become one of the most representative applications. Unable to be transparent, traditional antennas will firstly affect the aesthetic appearance of the whole glazing when used with a transparent glazing.

Secondly, due to the strong attenuation of glass to electromagnetic waves, the antenna cannot achieve effective electromagnetic energy radiation when tightly bonded to the glazing, finally causing a low antenna gain. Therefore, an antenna design scheme that can ensure a high gain of the antenna while achieving transparency of the antenna will become a trend for 5G embellished antennas.

SUMMARY

To solve at least one of the problems in the existing art, the present disclosure provides an antenna and an electronic device.

In a first aspect, an embodiment of the present disclosure provides an antenna, including a first substrate and a second substrate; wherein the first substrate includes:

a first dielectric substrate including a main substrate and a side substrate, where the main substrate has a first surface and a second surface opposite to each other in a thickness direction thereof, and the side substrate includes a third surface and a fourth surface opposite to each other in a thickness direction of the side substrate; and the second surface of the main substrate is connected to the third surface of the side substrate, and the side substrate protrudes out of the second surface of the main substrate;

a first reference electrode layer on the first surface and the fourth surface;

at least one first radiation part on the second surface; and at least one feeder group including at least one feeder, wherein the feeder is provided on the second surface and extends toward the third surface, each feeder in each feeder group is electrically connected to one first radiation part, and different feeders in the feeder group are electrically connected to different first radiation parts; and the second substrate includes:

a second dielectric substrate having a fifth surface and a sixth surface opposite to each other in a thickness direction of the second dielectric substrate; wherein the fifth surface is opposite to the fourth surface;

a second reference electrode layer on the fifth surface; and at least one feed structure on the sixth surface, wherein the feed structure corresponds to the feeder group, and for the corresponding feed structure and feeder group, each first feed port in the feed structure is electrically connected to one feeder in the feeder group through a first connection via; and the first connection via runs through at least the side substrate, the second reference electrode layer, and the second dielectric substrate.

The first reference electrode layer includes a first reference sub-electrode and a second reference sub-electrode connected to each other, the first reference sub-electrode is on the first surface, and the second reference sub-electrode is on the fourth surface;

the second reference sub-electrode is electrically connected to the second reference electrode layer; and the antenna further includes:

at least one first opening running through the second reference sub-electrode and the second reference electrode layer;

at least one first connection electrode on the fifth surface, wherein each first connection electrode is in one first opening, and a second feed port of one feed structure is electrically connected to the first connection electrode through a second connection via; and the second connection via runs through at least the second dielectric substrate; and at least one radio frequency line, a core of each of which is electrically connected to the first connection electrode through a third connection via; wherein the third connection via at least runs through the second dielectric substrate.

The antenna further includes:

at least one second connection electrode on the sixth surface and electrically connected to the second reference electrode layer through a fourth connection via running through the second dielectric substrate; wherein the third connection via further runs through the second connection electrode, and the reference electrode layer of the radio frequency line is electrically connected to the second connection electrode.

The antenna further includes a second opening running through the side substrate, wherein an orthographic projection of the second opening on a plane where the second dielectric substrate is located covers an orthographic projection of the first opening on the plane where the second dielectric substrate is located.

The second connection via and the third connection via each further run through the first connection electrode, the first connection electrode is welded to the second feed port of the feed structure through the second connection via, and a core of the radio frequency line is welded to the third connection via through the third connection via.

The first feed port is riveted or welded with the feeder by a connector through the first connection via.

The at least one feeder group includes a first feeder group and a second feeder group; a plurality of first feeders are provided in the first feeder group, and a plurality of second feeders are provided in the second feeder group; the at least one feed structure includes a first feed structure and a second feed structure; the first feed structure and the second feed structure each include a plurality of first feed ports and one second feed port, each of the first feed ports in the first feed structure is electrically connected to one of the first feeders, and each of the first feed ports in the second feed structure is electrically connected to one of the second feeders.

The antenna further includes: at least one director on the second surface and in one-to-one correspondence with the first radiation part, wherein the director is on a side of the corresponding first radiation part away from the side substrate.

The antenna further includes:

a third dielectric substrate having a seventh surface and an eighth surface opposite to each other in a thickness direction of the third dielectric substrate, wherein the seventh surface is opposite to, and spaced by a spacing from, the second surface; and at least one second radiation part on the seventh surface or the eighth surface, wherein orthographic projections of each second radiation part and one corresponding first radiation part on the first surface are at least partially overlapped.

The antenna further includes:

a plurality of support components between the second surface and the seventh surface to provide a spacing between the first radiation part and the second radiation part.

Each support component is a height-adjustable support component to adjust the spacing between the first radiation part and the second radiation part.

The antenna further includes:

a radome, wherein two opposite side walls of the radome are provided with a plurality of sets of slide rails; and the main substrate and the third dielectric substrate are insertable into different sets of slide rails.

The antenna further includes:

a radome including a first base material and a second base material opposite to each other; wherein the first dielectric substrate with the first reference electrode layer is on a side of the first base material close to the second base material; and the third dielectric substrate with the second radiation part is on a side of the second base material close to the first base material.

At least one of the first radiation part, the second radiation part, the first reference electrode layer, or the feeder includes a metal mesh.

The metal mesh has a line width in a range of 2 μm to 30 μm; a line spacing in a range of 50 μm to 250 μm; and a line thickness in a range of 1 μm to 10 μm.

The third dielectric substrate includes any one of polycarbonate plastic, cyclic olefin polymer plastic, or polymethyl methacrylate.

The first dielectric substrate includes any one of polycarbonate plastic, cyclic olefin polymer plastic, or polymethyl methacrylate.

The second substrate is a printed circuit board.

The main substrate and the side substrate form an integral structure.

In a second aspect, an embodiment of the present disclosure provides an electronic device, including any antenna as described above.

DETAIL DESCRIPTION OF EMBODIMENTS

To improve understanding of the technical solution of the present disclosure for one of ordinary skill in the art, the present disclosure will be described in detail with reference to accompanying drawings and specific implementations.

Unless otherwise defined, technical or scientific terms used in the present disclosure are intended to have general meanings as understood by one of ordinary skill in the art to which the present disclosure belongs. The words "first", "second" and similar terms used in the present disclosure do not denote any order, quantity, or importance, but are used merely for distinguishing different components from each other. Likewise, the words "a", "an", or "the" and similar referents do not denote a limitation of quantity, but rather denote the presence of at least one. The word "comprising" or "including" or the like means that the element or item preceding the word contains elements or items that appear after the word or equivalents thereof, but does not exclude other elements or items. The terms "connected" or "coupled" and the like are not restricted to physical or mechanical connections, but may include electrical connections, whether direct or indirect. The words "upper", "lower", "left", "right", and the like are merely used to indicate a relative positional relationship, and when an absolute position of the described object is changed, the relative positional relationship may be changed accordingly.

In a first aspect, an embodiment of the present disclosure provides an antenna, including a first substrate and a second substrate. The first substrate is provided with a radiation structure, and the second substrate is provided with a feed structure feeding the radiation structure.

Figure 1:
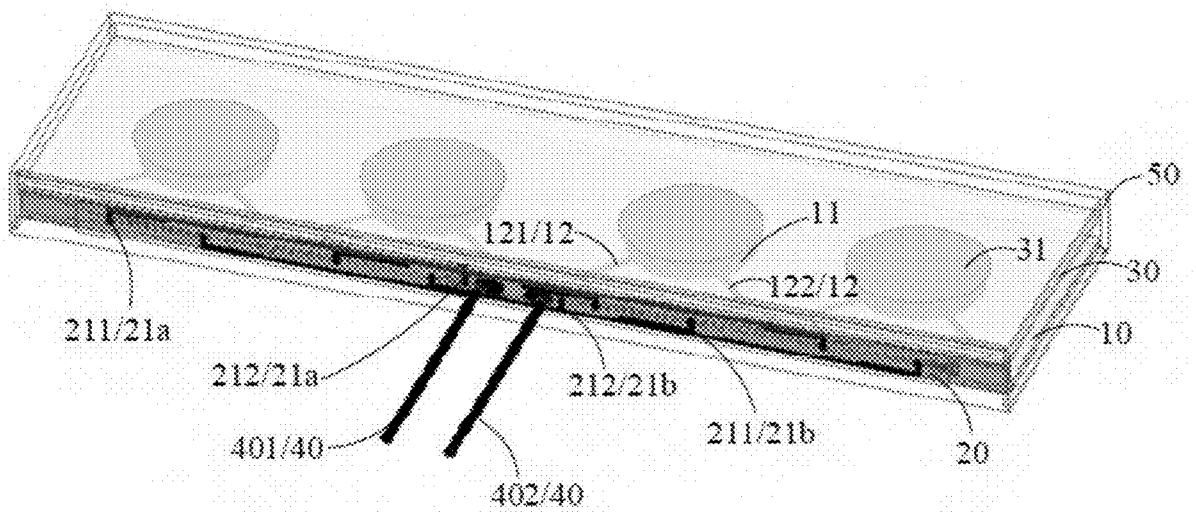
FIG. 1 is a schematic structural diagram of an antenna according to an embodiment of the present disclosure.
Figure 2:
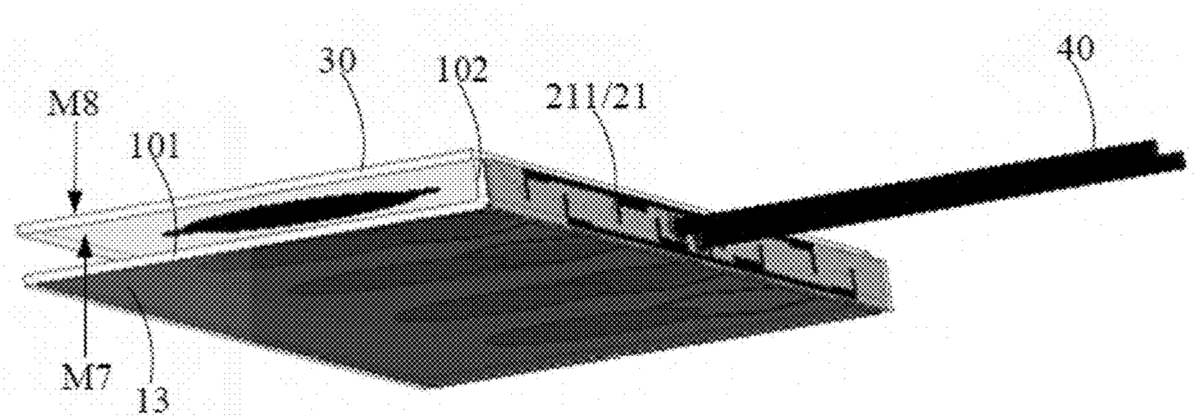
FIG. 2 is a schematic structural diagram of an antenna without any radome according to an embodiment of the present disclosure.
Figure 3:
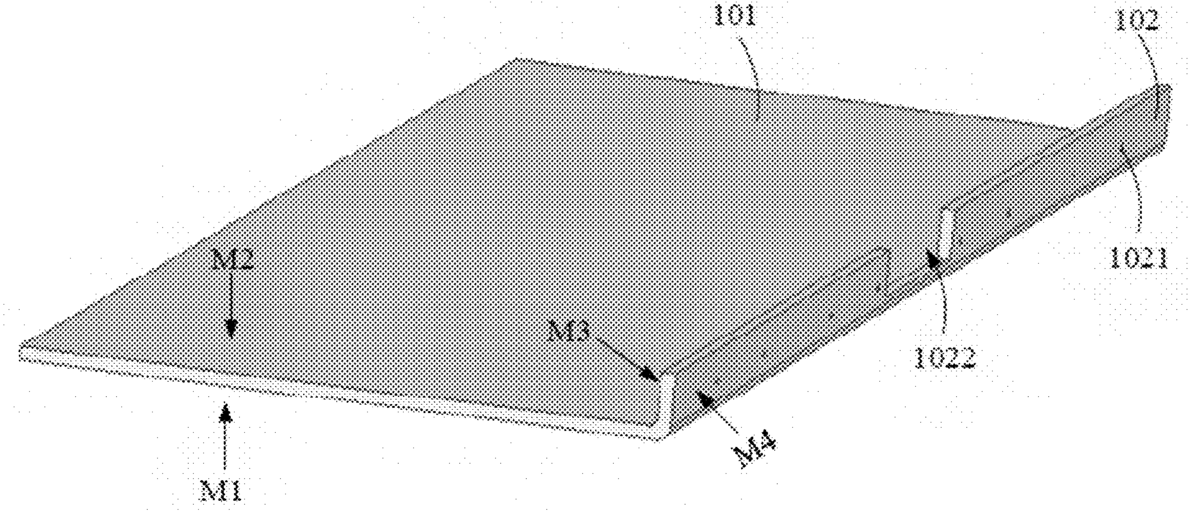
FIG. 3 is a schematic structural diagram of a first dielectric substrate in an antenna according to an embodiment of the present disclosure.

Specifically, FIG. 1 is a schematic structural diagram of an antenna according to an embodiment of the present disclosure; FIG. 2 is a schematic structural diagram of an antenna without any radome according to an embodiment of the present disclosure; and FIG. 3 is a schematic structural diagram of a first dielectric substrate in an antenna according to an embodiment of the present disclosure. As shown in FIGS. 1 to 3, the first substrate includes a first dielectric substrate 10, a first reference electrode layer 13, at least one first radiation part 11, and at least one feeder group. The first dielectric substrate 10 includes a main substrate 101 and a side substrate 102, the main substrate 101 includes a first surface M1 and a second surface M2 disposed opposite to each other in a thickness direction of the main substrate 101, and the side substrate 102 includes a third surface M3 and a fourth surface M4 disposed opposite to each other in a thickness direction of the side substrate. The second surface M2 of the main substrate 101 is connected to the third surface M3 of the side substrate 102, and the side substrate 102 protrudes out of the main substrate 101. In other words, the main substrate 101 and the side substrate 102 are connected to form an L-shaped first dielectric substrate 10. The first radiation part 11 is provided on the second surface M2 of the main substrate 101. The feeder group includes at least one feeder 12 on the second surface M2 of the main substrate 101 and extending toward the third surface M3 of the side substrate 102 (specifically, the feeder 12 may extend onto the third surface M3). One feeder 12 in each feeder group is electrically connected to one first radiation part 11, and different feeders 12 in the feeder group are electrically connected to different radiation parts. For example, for one feeder group, the feeders 12 therein are connected to the first radiation parts 11 in one-to-one correspondence. Specifically, in the embodiments of the present disclosure, only the case where the feeder 12 in each feeder group is directly connected to the first radiation part 11 is taken as an example, but in actual products, the feeder 12 and the first radiation part 11 may be electrically connected in any manner such as coupling.

Figure 5:
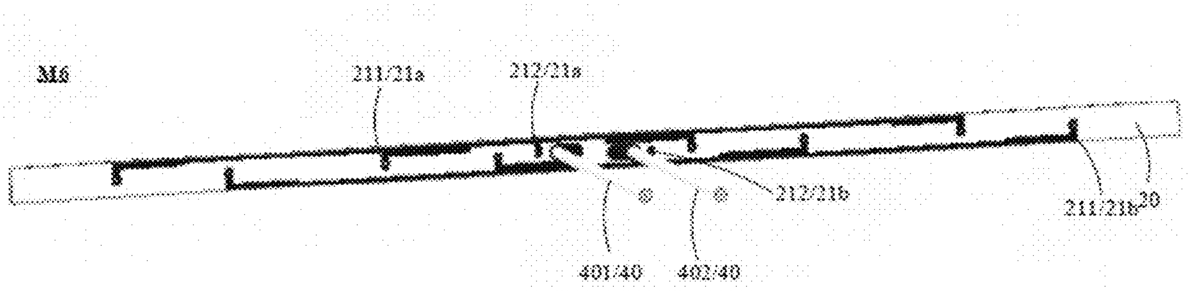
FIG. 5 is a schematic structural diagram showing a sixth surface side of a second dielectric substrate in an antenna according to an embodiment of the present disclosure.
Figure 6:
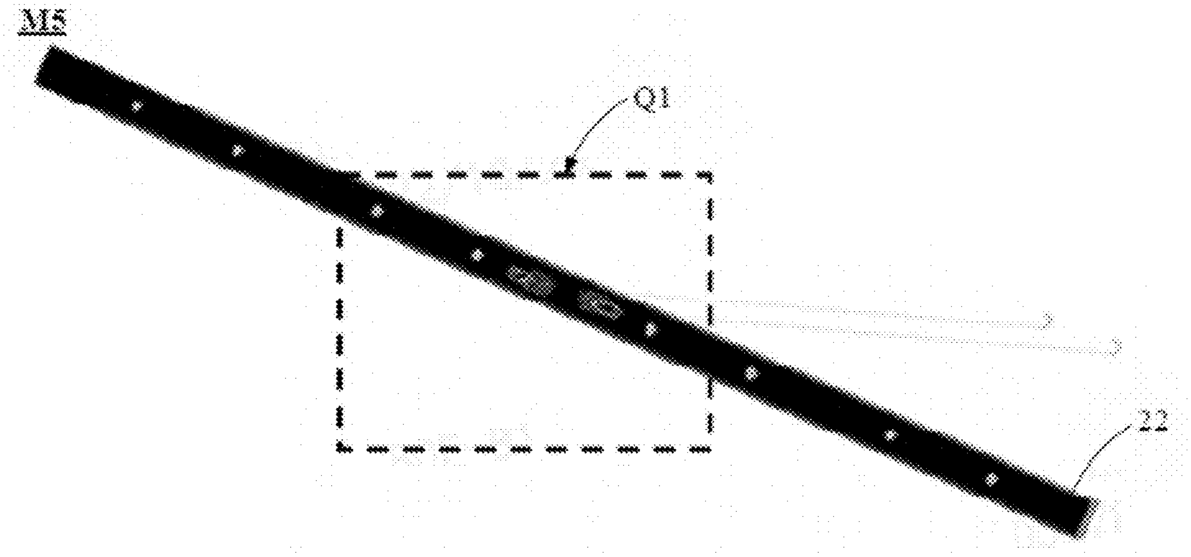
FIG. 6 is a schematic structural diagram showing a fifth surface side of a second dielectric substrate in an antenna according to an embodiment of the present disclosure.

FIG. 5 is a schematic structural diagram showing a sixth surface side of a second dielectric substrate in an antenna according to an embodiment of the present disclosure; and FIG. 6 is a schematic structural diagram showing a fifth surface side of a second dielectric substrate in an antenna according to an embodiment of the present disclosure. As shown in FIGS. 5 and 6, the second substrate includes a second dielectric substrate 20, a second reference electrode layer 22 and at least one feed structure 21. The second dielectric substrate 20 includes a fifth surface M5 and a sixth surface M6 disposed opposite to each other in a thickness direction of the second dielectric substrate 20. The fifth surface M5 of the second dielectric substrate 20 is disposed opposite to the fourth surface M4 of the side substrate 102, the second reference electrode layer 22 is disposed on the fifth surface M5 of the second dielectric substrate 20, and the feed structure 21 is disposed on the sixth surface M6 of the second dielectric substrate 20. The feed structures 21 and the feeder groups are connected in one-to-one correspondence, which means that one feed structure 21 feeds the feeders 12 in one feeder group. Further, since the feed structure 21 has at least one first feed port 211 and one second feed port 212, one first feed port 211 in each feed structure 21 feeds one feeder 12 in one feeder group. In other words, a microwave signal fed from the second feed port 212 of the feed structure 21 is fed to the feeder 12 connected to the feed structure 21 through the first feed port 211. In an embodiment of the present disclosure, the feeder 12 extends from the second surface M2 of the main substrate 101 to the third surface M3 of the side substrate 102, while the feed structure 21 is disposed on the sixth surface M6 of the second dielectric substrate 20, and the antenna includes a first connection via 1021 running through at least the second reference electrode, the second dielectric substrate 20 and the side substrate 102. In this case, the first feed port 211 of the feed structure 21 is electrically connected to the corresponding feeder 12 through the first connection via 1021, to transmit electromagnetic waves to the first radiation part 11 electrically connected to the feeder 12.

In an embodiment of the present disclosure, the main substrate 101 and the side substrate 102 are formed into the L-shaped first dielectric substrate 10, and the feeder 12 connected to the first radiation part 11 extends from the main substrate 101 to the side substrate 102, while the second substrate is disposed on a side of the side substrate 102, a portion of the feeder 12 on the side substrate 102 is connected to the first feed port 211 of the feed structure 21 on the second substrate through the first connection via 1021, where the first connection via 1021 is a hole running through the side substrate 102 and the second dielectric substrate 20 of the second substrate. Therefore, the alignment between the feeder 12 and the corresponding first feed port 211 is facilitated, precise connection is achieved, and the problem of the mis-connection can be avoided.

It should be noted that although FIG. 1 in the embodiments of the present disclosure only shows the example of four first radiation parts 11, the number of first radiation parts 11 may be set as required in an actual product. Since there are four first radiation parts 11, four feeders 12 are also provided in the corresponding feeder group, and also four first feed ports 211 are provided in each feed structure 21. That is, the feed structure 21 may be a one-to-four power divider.

Specifically, the one-to-four power divider may include a main path and four branches, where a first end of the main path is used as the second feed port 212, a second end of the main path is connected to first ends of the four branches, and second ends of the four branches are used as the first feed ports 211, respectively. In the embodiment of the present disclosure, line widths of the main path and the branches may be designed such that each of the four first feed ports 211 of the one-to-four power divider has an impedance of 50Q.

Figure 4:
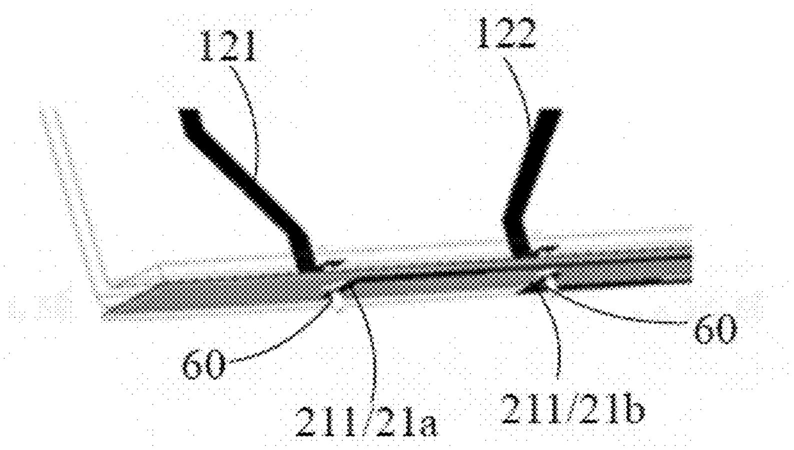
FIG. 4 is a schematic diagram illustrating a connection of a feeder with a first feed port of a feed structure in an antenna according to an embodiment of the present disclosure.

With continued reference to FIG. 1, in an embodiment of the present disclosure, taking the antenna being a dual-polarized antenna as an example, the antenna includes two feeder groups, i.e., a first feeder group and a second feeder group, and for convenience of description, the feeder 12 in the first feeder group is referred to as a first feeder 121, and the feeder 12 in the second feeder group is referred to as a second feeder 122. Accordingly, two corresponding feed structures 21 are provided, which are referred to as a first feed structure 21*a* and a second feed structure 21*b*, respectively, and each of the first feed structure 21*a* and the second feed structure 21*b* may be a one-to-four power divider. Specifically, FIG. 4 is a schematic diagram illustrating a connection of a feeder with a first feed port of a feed structure in an antenna according to an embodiment of the present disclosure. As shown in FIG. 4, one first feed port 211 of the first feed structure 21*a* is electrically connected to one first feeder 121, and one first feed port 211 of the second feed structure 21*b* is electrically connected to one second feeder 122. One first radiation part 11 is electrically connected to one first feeder 121 and one second feeder 122. For one first radiation part 11 and the first feeder 121 and second feeder 122 electrically connected thereto, a connection node between the first feeder 121 and the first radiation part 11 is a first node, and a connection node between the second feeder 122 and the first radiation part 11 is a second node. In this case, a connection line between the first node and the center of the first radiation part 11 is a first line segment, a connection line between the second node and the center of the first radiation part 11 is a second line segment, and an extending direction of the first line segment is intersected with an extending direction of the second line segment. For example: the extending direction of the first line segment is perpendicular to the extending direction of the second line segment, in which case the antenna can realize polarization directions of 0°/90°.

Further, with continued reference to FIG. 1, in addition to the above structures, the dual-polarized antenna in the embodiment of the present disclosure further includes a third substrate including a third dielectric substrate 30, and a second radiation part 31 on the third dielectric substrate 30. Specifically, the third dielectric substrate 30 includes a seventh surface M7 and an eighth surface M8 disposed opposite to each other. The second radiation part 31 may be disposed on the seventh surface M7, or on the eighth surface M8, and a certain spacing is provided between the seventh surface M7 of the third dielectric substrate 30 and the second surface M2 of the main substrate 101. Orthographic projections of one second radiation part 31 and one first radiation part 11 on a plane where the main substrate 101 is located are at least partially overlapped. The opposite first radiation part 11 and second radiation part 31 increase the radiation area of the radiating elements, thereby effectively improving the radiation efficiency.

The embodiment of the present disclosure only shows the example of the antenna being a dual-polarized antenna, and since a connection between the first feed structure 21*a* and the first feeder 121, and a connection between the first feeder 121 and the first radiation part 11, are the same as a connection between the second feed structure 21*b* and the second feeder 122, and a connection between the second feeder 122 and the first radiation part 11, respectively, and for convenience of description, the following description will be made by only taking the case where the first feed structure 21*a* is electrically connected to the first radiation part 11 through the first feeder 121 as an example.

Figure 7:
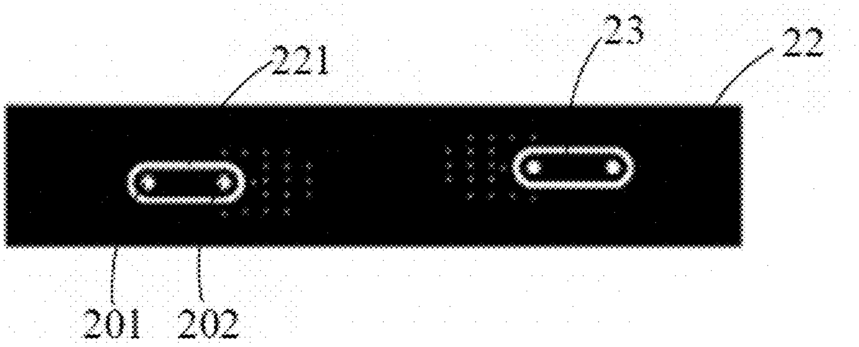
FIG. 7 is a partially enlarged view at position Q1 in FIG. 6.
Figure 8:
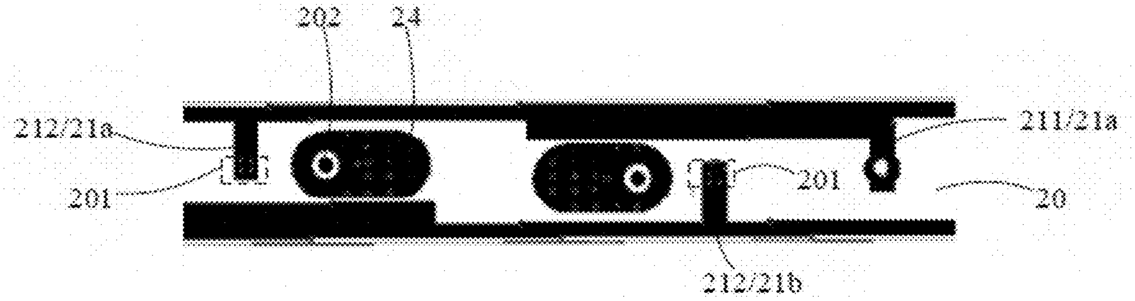
FIG. 8 is a partial structural diagram of a sixth surface side of a second dielectric substrate in an antenna according to an embodiment of the present disclosure.

In some examples, FIG. 7 is a partially enlarged view at position Q1 in FIG. 6; and FIG. 8 is a partial structural diagram of a sixth surface side of a second dielectric substrate in an antenna according to an embodiment of the present disclosure. As shown in FIGS. 5 to 8, the first reference electrode layer 13 in the first substrate includes a first reference sub-electrode and a second reference sub-electrode connected to each other, the first reference sub-electrode is disposed on the first surface M1 of the main substrate 101, and the second reference sub-electrode is disposed on the fourth surface M4 of the side substrate 102. In this case, the second reference sub-electrode and the second reference electrode layer 22 are bonded and electrically connected to each other. The antenna includes at least one first opening 221 and at least one radio frequency line 40. The number of first openings 221 and the number of radio frequency lines 40 both correspond to the number of feed structures 21, and since the antenna includes two feed structures 21, two first openings 221 and two radio frequency lines 40 are also provided.

Specifically, the two first openings 221 each run through the first reference sub-electrode and the second reference electrode layer 22, and are each provided with a first connection electrode 23. The first connection electrode 23 is disposed on the third surface M3 of the second dielectric substrate 20. For the first connection electrode 23 in one of the first openings 221, the second feed port of the first feed structure 21*a* is connected to the first connection electrode 23 through a second connection via 201 running through at least the second dielectric substrate 20, while the first connection electrode 23 is further connected to a core of one radio frequency line 40 through a third connection via 202 running through at least the second dielectric substrate 20. For the first connection electrode 23 in the other first opening 221, the second feed port of the second feed structure 21*b* is connected to the first connection electrode 23 through a second connection via 201 running through at least the second dielectric substrate 20, while the first connection electrode 23 is further connected to a core of the other radio frequency line 40 through a third connection via 202 running through at least the second dielectric substrate 20. In this manner, it is achieved that one radio frequency line 40 feeds the first feeder 121 through the first feed structure 21*a*, and the other radio frequency line 40 feeds the second feeder 122 through the second feed structure 21*b*.

Further, the antenna further includes two second connection electrodes 24 on the second dielectric substrate 20, and the two second connection electrodes 24 are each connected to the second reference electrode layer 22 through a fourth connection via running through the second dielectric substrate 20. The third connection via 202, electrically connecting the core of the radio frequency line 40 and the first connection electrode 23, runs through not only the second dielectric substrate 20 as described above, but also the second connection electrode 24. A reference electrode layer (e.g., ground layer) of the radio frequency line 40 is electrically connected to the second reference electrode layer 22 through the second connection electrode 24. A plurality of fourth connection vias electrically connecting each second connection electrode 24 and the second reference electrode layer 22 may be provided to ensure stable connection between the second reference electrode layer 22 and the second connection electrode 24.

Still further, with continued reference to FIG. 3, a second opening 1022 is formed in the side substrate 102 of the first dielectric substrate 10, and an orthographic projection of the second opening 1022 on a plane where the second dielectric substrate 20 is located covers an orthographic projection of the first opening 221 on the plane where the second dielectric substrate 20 is located. In this manner, the second opening 1022 in the side substrate 102 can facilitate connection between the first connection electrode 23 and the second feed port 212 of the feed structure 21. Particularly, when the feed port of the feed structure 21 is welded to the first connection electrode 23, the second opening 1022 formed at such a position of the side substrate 102 can prevent short circuit between the first connection electrode 23 and the first reference electrode layer 13. The second opening 1022 may be a U-shaped opening formed in the side substrate 102, and an orthographic projection of the U-shaped opening on the plane where the second dielectric substrate 20 is located covers orthographic projections of the two first openings 221 on the plane where the second dielectric substrate 20 is located. The second opening 1022 may alternatively be an annular opening. Apparently, the second opening 1022 may further include two sub-openings arranged in one-to-one correspondence with the two first openings 221. The sub-openings may be U-shaped or annular openings.

Specifically, the second connection via 201 runs through not only the second dielectric substrate 20, but also the first connection electrode 23, while the third connection via 202 runs through not only the second dielectric substrate 20, but also the first connection electrode 23. The first connection electrode 23 is welded to the second feed port 212 of the feed structure 21 through the second connection via 201, and the core of the radio frequency line 40 is welded to the first connection electrode 23 through the third connection via 202. In other words, the second feed port 212 of the feed structure 21 is connected to the first connection electrode 23 by welding, and the radio frequency line 40 is also connected to the first connection electrode 23 by welding, so that secure fixation and stable connection are implemented.

In some examples, with continued reference to FIG. 4, the first feed port 211 of the feed structure 21 is connected to the feeder 12 by a rivet 60 running through the first connection via 1021. In other words, the first connection via 1021 will run through the first feed port 211 and the feeder 12, and then the rivet 60 is inserted into the first connection via 1021 to connect the first feed port 211 and the feeder 12. Specifically, the first feed port 211 of the first feed structure 21*a* is connected to the first feeder 121 by a rivet 60 running through a first connection via 1021, and the first feed port 211 of the second feed structure 21*b* is connected to the second feeder 122 by a rivet 60 running through a first connection via 1021.

In some examples, the first feed port 211 of the feed structure 21 is connected to the feeder 12 by welding together through the first connection via 1021. Specifically, the first feed port 211 of the first feed structure 21*a* is welded to the first feeder 121 through a first connection via 1021, and the first feed port 211 of the second feed structure 21*b* is welded to the second feeder 122 through a first connection via 1021.

Figure 9A:
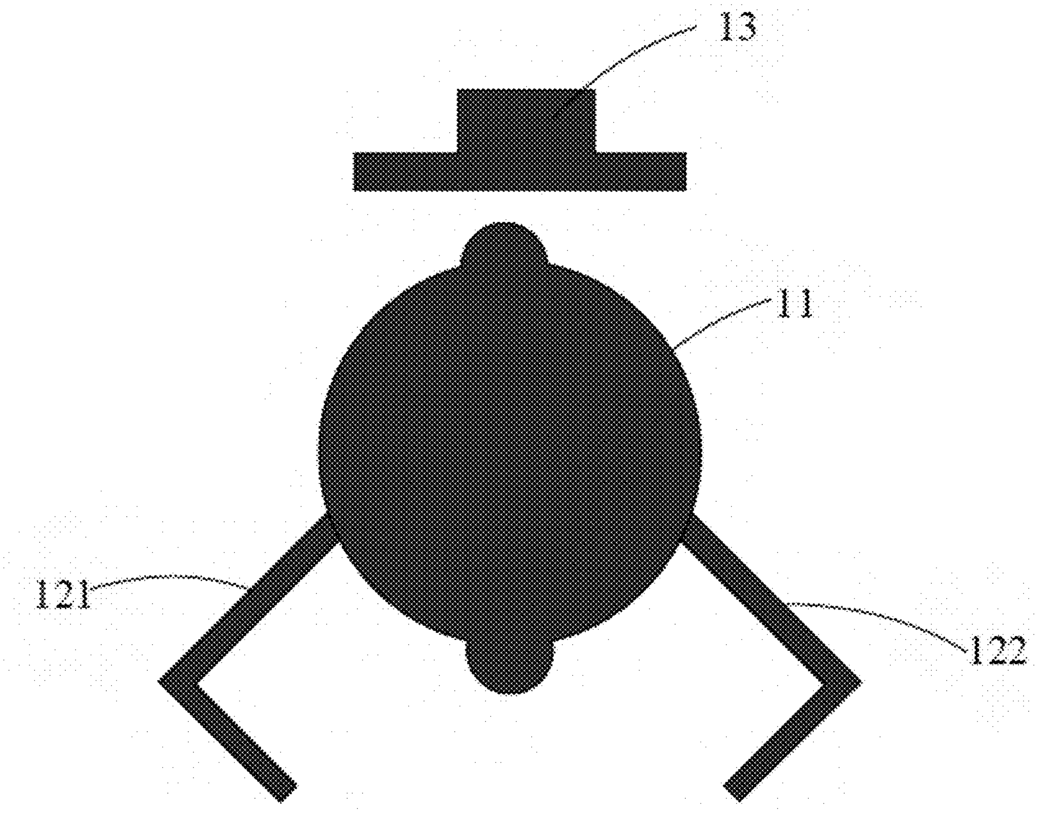
FIG. 9*a* is a schematic diagram showing a positional relationship between a first radiation part and a director in an antenna according to an embodiment of the present disclosure.
Figure 10:
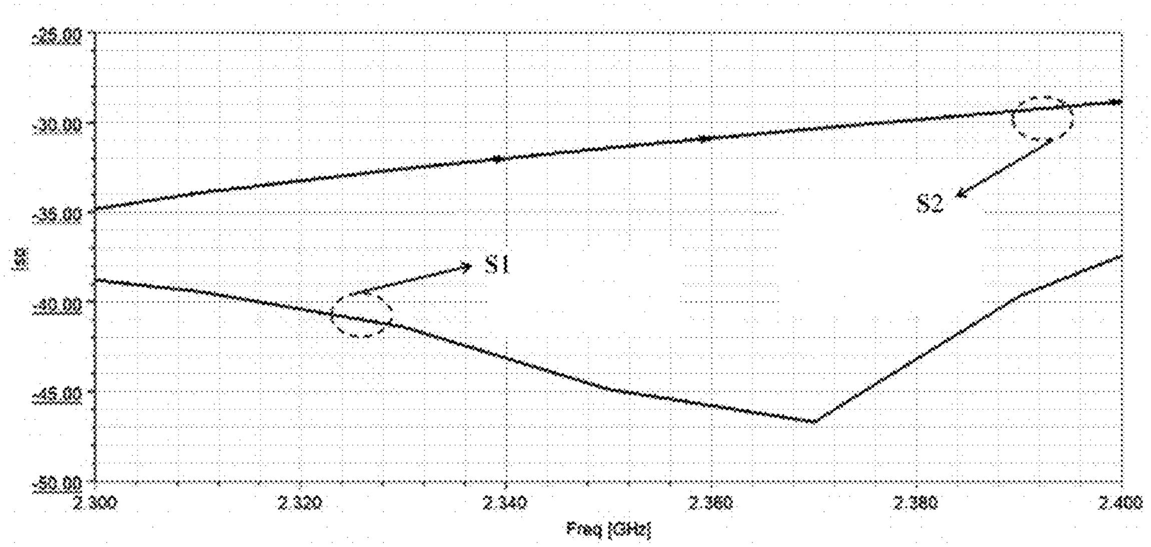
FIG. 10 is an isolation plot of an antenna with and without a director according to an embodiment of the present disclosure.

In some examples, FIG. 9*a* is a schematic diagram showing a positional relationship between a first radiation part and a director in an antenna according to an embodiment of the present disclosure. As shown in FIG. 9*a*, the antenna further includes at least one director 13 on the second surface M2 of the main substrate 101 and in one-to-one correspondence with the first radiation part 11. The director 13 is located on a side of the first radiation part 11 away from the side substrate 102. Since four first radiation parts 11 are provided in FIG. 1, also four directors 13 are provided. Each director 13 is configured to change current distribution at an edge of the corresponding first radiation part 11, so that the current is restrained and further regularized, and thereby isolation of the antenna is improved. FIG. 10 is an isolation plot of an antenna with and without a director according to an embodiment of the present disclosure. As shown in FIG. 10, S1 is an isolation curve of an antenna with a director 13, while S2 is an isolation curve of an antenna without any director 13. It can be seen that the isolation of the antenna is significantly improved by introducing the director 13.

Further, FIG. 9*a* only shows an exemplary structure of the director 13, including a first sub-electrode and a second sub-electrode, where the first sub-electrode is located on a side of the first radiation part 11 away from a side substrate, and the second sub-electrode is connected to a side of the first sub-electrode away from the first radiation part 11. It should be understood that the director 13 is not limited to the structure shown in FIG. 9*a*, and other structures of the director 13 is also possible.

In some examples, in addition to the above structures, the antenna further includes a radome 50, and the first substrate, the second substrate, and the third substrate of the antenna are all located within an accommodation space defined by the radome 50. The first substrate and the third substrate are disposed on upper and lower surfaces of the radome 50, and bonded to the upper and lower surfaces of the radome 50, respectively, by an optical clear adhesive (OCA), for example. Specifically, the radome 50 includes a first base material and a second base material disposed opposite to each other, the first dielectric substrate 10 with the first reference electrode layer 13 is disposed on a side of the first base material close to the second base material, and the third dielectric substrate 30 with the second radiation part 31 is disposed on a side of the second base material close to the first base material.

Further, the radome 50 may be made of a material including plastic, such as: polycarbonate (PC), copolymers of cycloolefin (COP), or acrylic/polymethyl methacrylate (PMMA).

Figure 11:
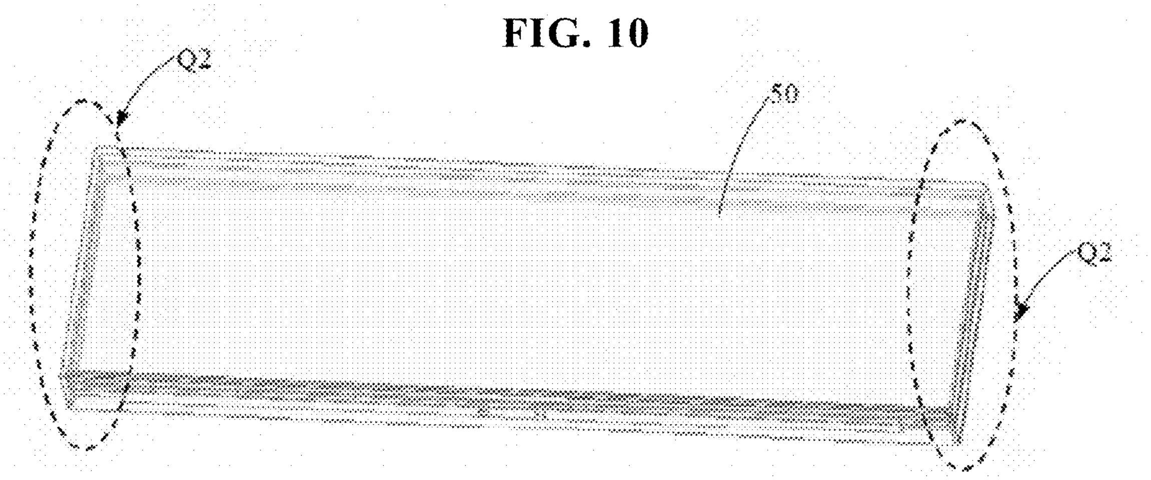
FIG. 11 is a schematic diagram showing a fixation manner of a first dielectric substrate and a third dielectric substrate in an antenna according to an embodiment of the present disclosure.
Figure 12:
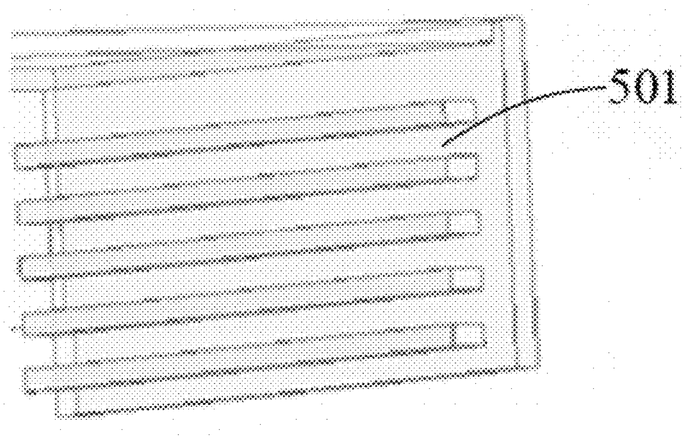
FIG. 12 is a partially enlarged view at position Q2 in FIG. 11.

In some examples, FIG. 11 is a schematic diagram showing a fixation manner of a first dielectric substrate and a third dielectric substrate in an antenna according to an embodiment of the present disclosure; and FIG. 12 is a partially enlarged view at position Q2 in FIG. 11. As shown in FIGS. 11 and 12, a plurality of sets of slide rails 501 are provided on two opposite side walls of the radome 50, and the main substrate 101 and the third dielectric substrate 30 are insertable into different sets of slide rails 501, so that a certain spacing is provided between the main substrate 101 and the third dielectric substrate 30. In this case, the slide rails 501 on the side walls of the radome 50 can be used as supports for the main substrate 101 and the third dielectric substrate 30. Apparently, where three or more sets of slide rails 501 are provided, a distance between the main substrate 101 and the first dielectric substrate 10 can be adjusted by selecting different sets of slide rails 501 to support the main substrate 101 and the third dielectric substrate 30, so that a relative distance between the first substrate and the third substrate in the antenna is adjustable, and thus one set of antennas can be shared by multiple bands.

Figure 13:
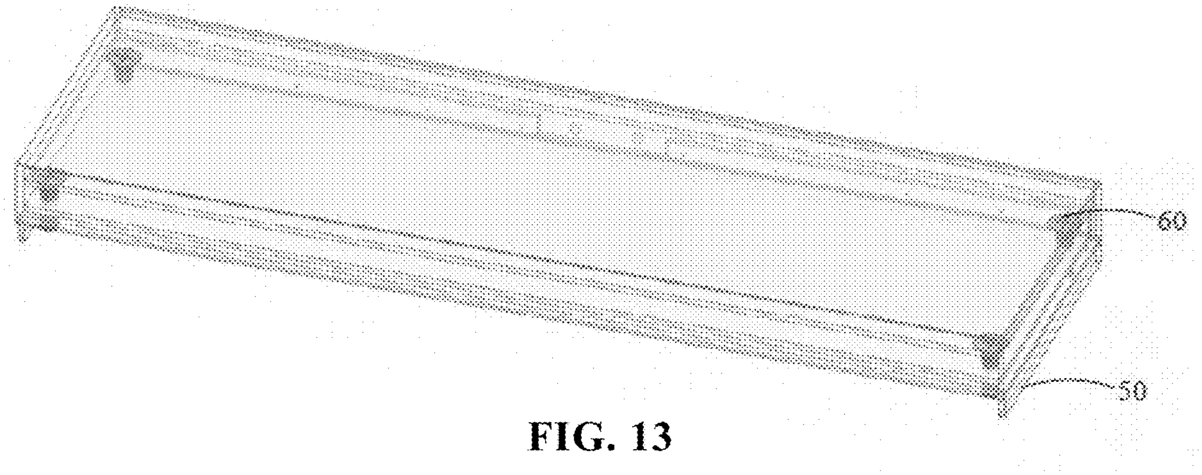
FIG. 13 is a schematic diagram showing another fixation manner of a first dielectric substrate and a third dielectric substrate in an antenna according to an embodiment of the present disclosure.
Figure 14:
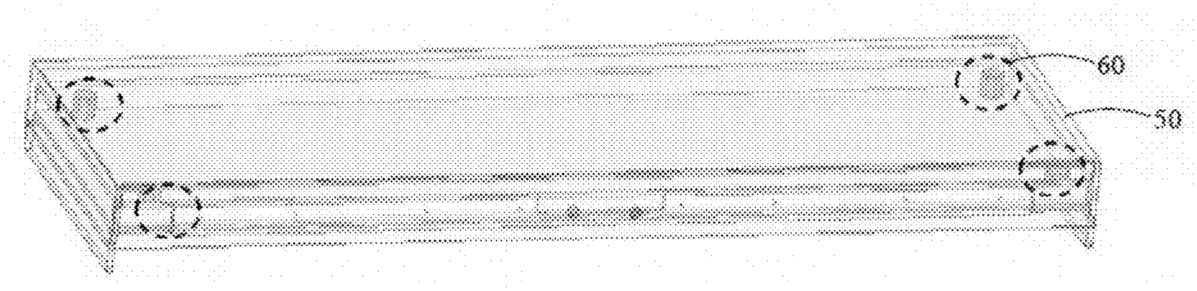
FIG. 14 is a schematic diagram showing yet another fixation manner of a first dielectric substrate and a third dielectric substrate in an antenna according to an embodiment of the present disclosure.

In some examples, FIG. 13 is a schematic diagram showing another fixation manner of a first dielectric substrate and a third dielectric substrate in an antenna according to an embodiment of the present disclosure. As shown in FIG. 13, the adjustment of the distance between the first substrate and the third substrate can also be implemented by supporting the main substrate 101 of the first dielectric substrate 10 and the third dielectric substrate 30 with support components. Each support component may be a height-adjustable support component to adjust the spacing between the first substrate and the third substrate, that is, adjust a spacing between the first radiation part 11 and the second radiation part 31. For example: the support components are rotating screws. Apparently, FIG. 14 is a schematic diagram showing yet another fixation manner of a first dielectric substrate and a third dielectric substrate in an antenna according to an embodiment of the present disclosure. As shown in FIG. 14, the support components may include multiple groups of support components of different heights, and the distance between the first substrate and the third substrate is maintained by selecting different groups of support components.

Further, the support components may be provided at four corners of the main substrate 101, thereby providing stable support for the first substrate and the third substrate.

In some examples, the first radiation parts 11 and the second radiation parts 31 are arranged in one-to-one correspondence, and have the same pattern. For example: the first radiation part 11 and the second radiation part 31 each have a circular or polygonal shape or the like. In one example, the first radiation part 11 and the second radiation part 31 each have a centrosymmetric pattern, and orthographic projections of centers of the first radiation part 11 and the second radiation part 31 on the first surface M1 of the main substrate 101 coincide.

Further, referring to FIG. 9*a*, a protrusion is connected to the first radiation part 11, forms an integral structure with the first radiation part 11, and functions to improve a cross-polarization ratio of the antenna. Two protrusions may be provided and connected to the first radiation part 11, and disposed opposite to each other. For one first radiation part 11 and the first feeder 121, the second feeder 122 and the two protrusions electrically connected to the first radiation part 11, a connection node between the first feeder 121 and the first radiation part 11 is a first node, a connection node between the second feeder 122 and the first radiation part 11 is a second node, the first node and the second node divide an outline of the first radiation part 11 into a first portion and a second portion, one of the two protrusions is connected to the first portion, and the other is connected to the second portion. Specifically, one of the protrusions is connected to a center of the first portion, and the other is connected to a center of the second portion.

Figure 9B:
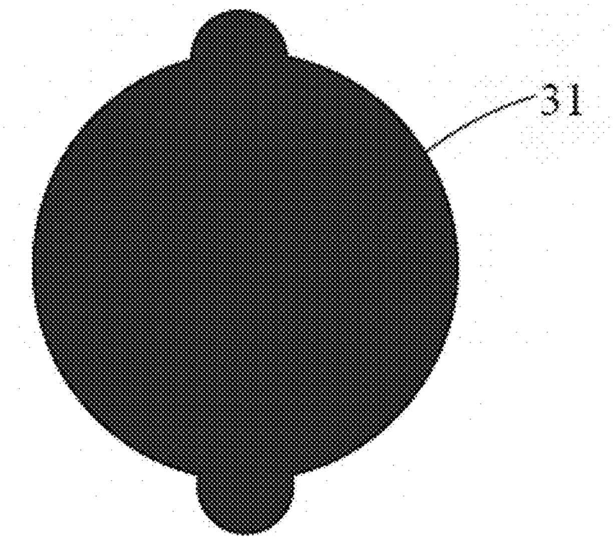
FIG. 9*b* is a top view of a second radiation part in an antenna according to an embodiment of the present disclosure.

FIG. 9*b* is a top view of a second radiation part in an antenna according to an embodiment of the present disclosure. As shown in FIG. 9*b*, a protrusion is connected to the second radiation part 31, forms an integral structure with the second radiation part 31, and functions to improve a cross-polarization ratio of the antenna. Two protrusions may be provided and connected to the second radiation part 31, and disposed opposite to each other. The protrusions connected to the second radiation part 31 may correspond to the protrusions connected to the first radiation part 11. Apparently, where the protrusions are connected to the second radiation part 31, the protrusions connected to the first radiation part 11 may be omitted.

In some embodiments, the antenna in the embodiments of the present disclosure may be a transparent antenna, and in this case, the conductive structures on the first substrate and the third substrate of the antenna are all transparent structures. Specifically, in an embodiment of the present disclosure, the first reference electrode layer 13, the first radiation part 11, the second radiation part 31, the first feeder 121, and the second feeder 122 each have a metal mesh structure, or are each made of a transparent conductive material, such as graphene or indium tin oxide or other transparent materials.

Figure 15:
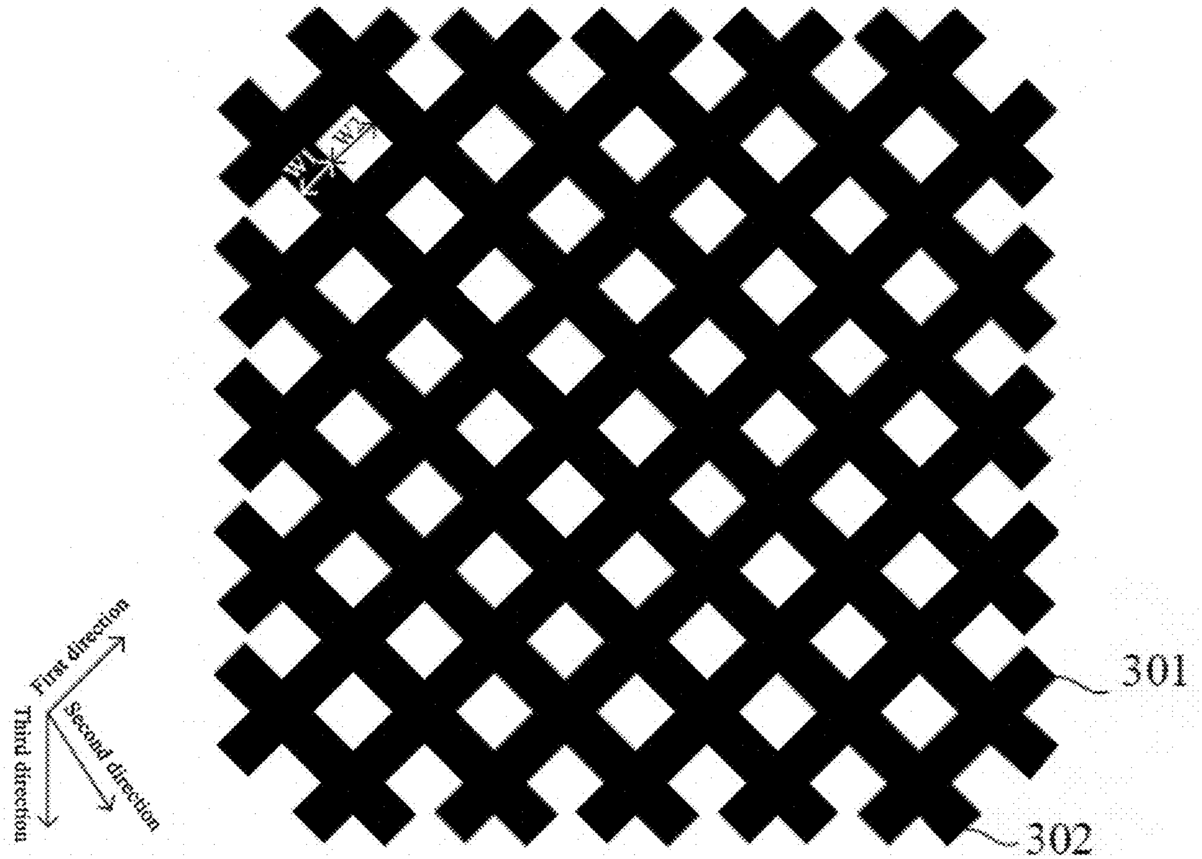
FIG. 15 is a schematic structural diagram of a metal mesh according to an embodiment of the present disclosure.

Further, FIG. 15 is a schematic structural diagram of a metal mesh according to an embodiment of the present disclosure. As shown in FIG. 15, where the first reference electrode layer 13, the first radiation part 11, the second radiation part 31, the first feeder 121, and the second feeder 122 each adopt a metal mesh, the metal mesh may include a plurality of first metal lines and a plurality of second metal lines arranged crosswise with each other. The first metal lines are arranged side by side in a first direction and extend in a second direction; while the second metal lines are arranged side by side in the first direction and extend in a third direction. Extending directions of the first metal lines and the second metal lines of the metal mesh may be perpendicular to each other, and in this case, square or rectangular hollowed-out portions are formed. Apparently, the extending directions of the first metal lines and the second metal lines of the metal mesh may be not perpendicular to each other. For example: the extending directions of the first metal lines and the second metal lines form an angle of 45°, and in this case, diamond hollowed-out portions are formed.

In some examples, the first metal lines 301 and the second metal lines 302 of the metal mesh preferably have the same line width, line thickness and line spacing, but apparently, different line widths, line thicknesses and line spacings are also possible. For example: the first metal line and the second metal line each have a line width W1 of about 1 μm to 30 μm, a line spacing W2 of about 50 μm to 250 μm, and a line thickness of about 0.5 μm to 10 μm. The metal mesh in the embodiments of the present disclosure may be formed on a flexible base material by a process including, but not limited to, imprinting or etching, and then bonded to the first dielectric substrate 10/the third dielectric substrate 30. For example: the first reference electrode layer 13 is formed on a first flexible base material by a process including, but not limited to, imprinting or etching, the first radiation part 11 and the feeder 12 are formed on a second flexible base material by a process including, but not limited to, imprinting or etching, the first flexible base material is bonded to the first surface M1 of the main substrate 101 and the fourth surface M4 of the side substrate 102, and the second flexible base material is bonded to the second surface M2 of the main substrate 101 and the third surface M3 of the side substrate 102. The second radiation part 31 is formed on a third flexible base material by a process including, but not limited to, imprinting or etching, and the third flexible base material is bonded to the eighth surface M8 of the third dielectric substrate 30. Each of the first flexible base material, the second flexible base material, and the third flexible base material may be a flexible film made of a material including, but not limited to, polyethylene terephthalate (PET), polyimide (PI), or the like.

In some examples, each of the first dielectric substrate 10 and the third dielectric substrate 30 is a support for a flexible base material, and is made of a material including, but not limited to, polycarbonate (PC), copolymers of cycloolefin (COP), or acrylic/polymethyl methacrylate (PMMA) or the like. In addition, the first flexible base material and the second flexible base material may be bonded to the first dielectric substrate 10 by an optical clear adhesive, and likewise, the third flexible base material may also be bonded to the third dielectric substrate 30 by an optical clear adhesive.

In some examples, the second substrate is a printed circuit board (PCB).

In some examples, the antenna in the embodiments of the present disclosure may be a transparent antenna that can be applied to glazing systems including, but not limited to, those for automobiles, trains (including high-speed trains), aircrafts, buildings, and the like. The transparent antenna may be fixed to an inner side of the glazing (a side close to the room). Since the transparent antenna has high optical transmittance, it has little influence on the transmittance of the glazing while enabling a communication function, and the transparent antenna also represents a trend of beautified antennas.

To better clarify the performance of the embodiments of the present disclosure, the antenna shown in FIG. 1 is taken as an example for simulation of the antenna at the operating frequencies of 2.25 GHz to 2.45 GHz.

Figure 16:
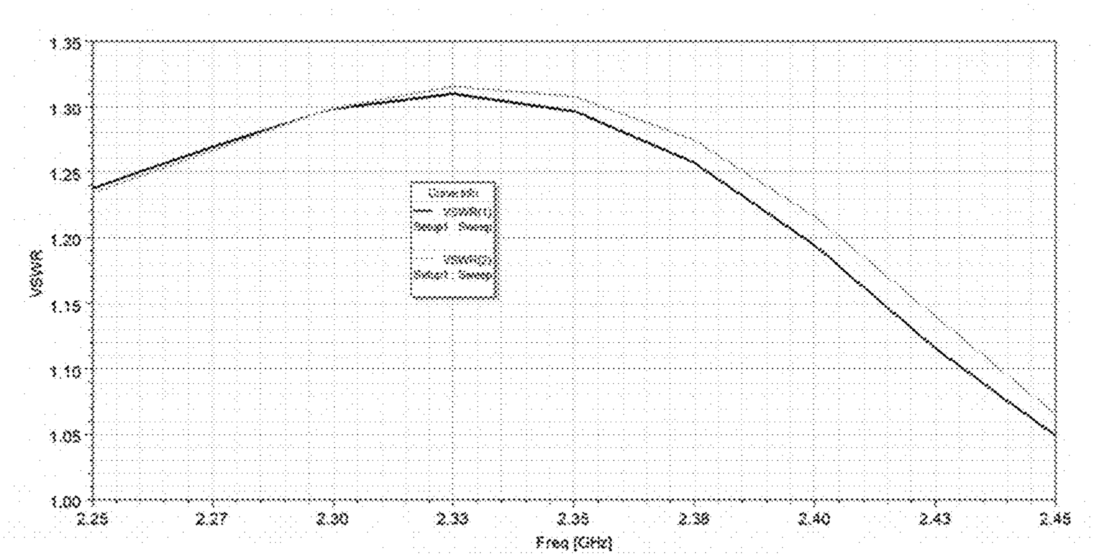
FIG. 16 is a standing wave plot of the antenna in FIG. 1 at 2.25 GHz to 2.45 GHz.

FIG. 16 is a standing wave plot of the antenna in FIG. 1 at 2.25 GHz to 2.45 GHz. As shown in FIG. 16, it can be seen that the antenna has excellent broadband characteristics, and can cover the frequency band of 2.25 GHz to 2.45 GHz under the standard of a standing-wave ratio less than 1.5 in the example, thereby ensuring wider application scenarios of the antenna.

Figure 17:
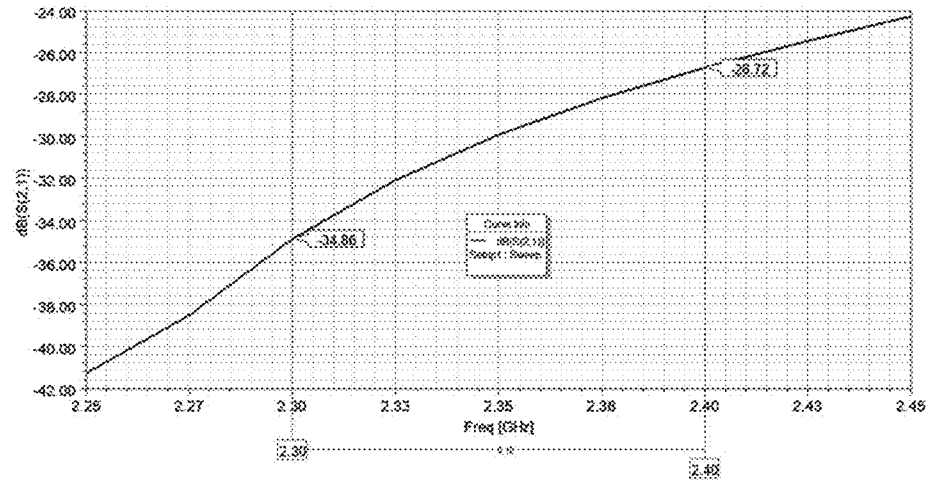
FIG. 17 is an isolation plot of the antenna in FIG. 1 at 2.25 GHz to 2.45 GHz.

FIG. 17 is an isolation plot of the antenna in FIG. 1 at 2.25 GHz to 2.45 GHz. As shown in FIG. 17, it can be seen that the antenna has excellent isolation, and has an isolation ratio less than −24 dB in the example, thereby ensuring wider application scenarios of the antenna.

Figure 18:
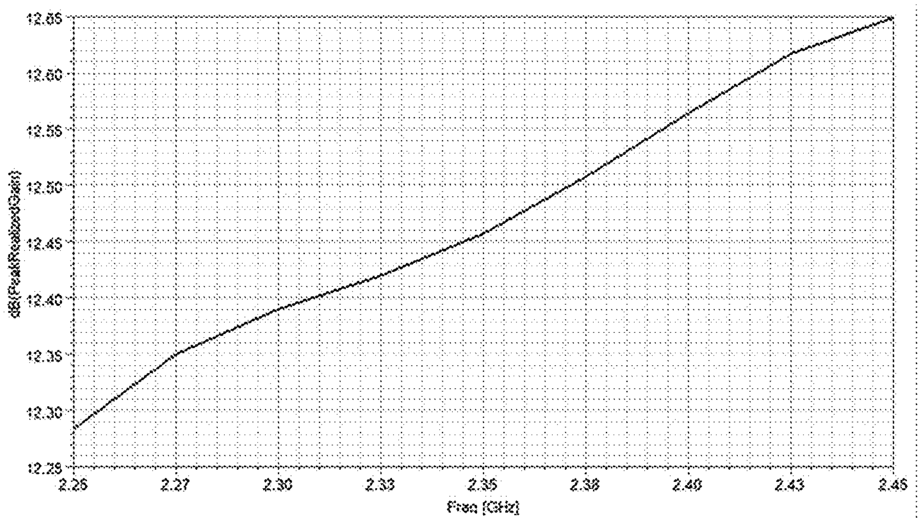
FIG. 18 is a gain plot of the antenna in FIG. 1 at 2.25 GHz to 2.45 GHz.

FIG. 18 is a gain plot of the antenna in FIG. 1 at 2.25 GHz to 2.45 GHz. As shown in FIG. 18, it can be seen that the antenna has excellent gain characteristics, and has a gain higher than 12 dBi in the example, thereby ensuring wider application scenarios of the antenna.

Figure 19:
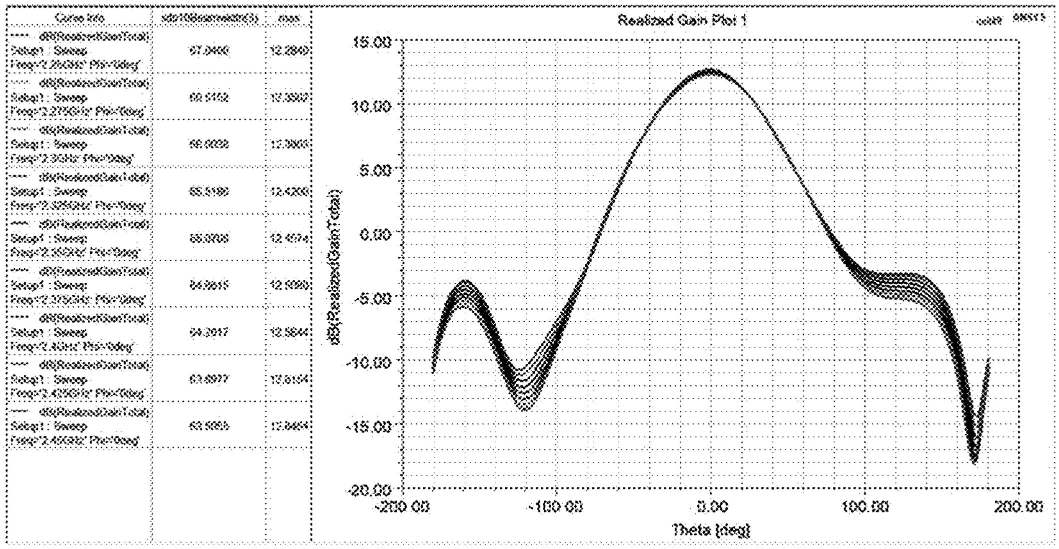
FIG. 19 is a 0° direction plot of the antenna in FIG. 1 at 2.25 GHz to 2.45 GHz.

FIG. 19 is a 0° direction plot of the antenna in FIG. 1 at 2.25 GHz to 2.45 GHz. As shown in FIG. 19, it can be seen that the transparent antenna of the present disclosure has excellent radiation characteristics, i.e., 65±2° in the 0° direction in the example, thereby ensuring wider application scenarios of the antenna.

Figure 20:
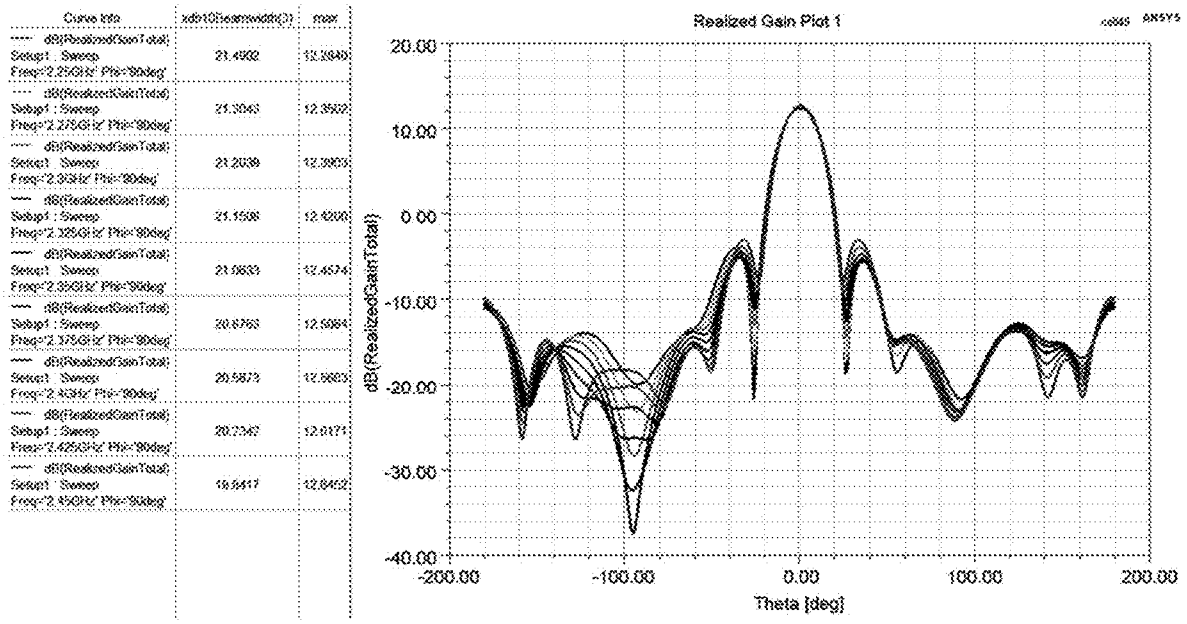
FIG. 20 is a 900 direction plot of the antenna in FIG. 1 at 2.25 GHz to 2.45 GHz.

FIG. 20 is a 900 direction plot of the antenna in FIG. 1 at 2.25 GHz to 2.45 GHz. As shown in FIG. 20, it can be seen that the antenna has excellent radiation characteristics, i.e., 20.5±0.5° in the 90° direction in the example, thereby ensuring wider application scenarios of the antenna.

Figure 21:
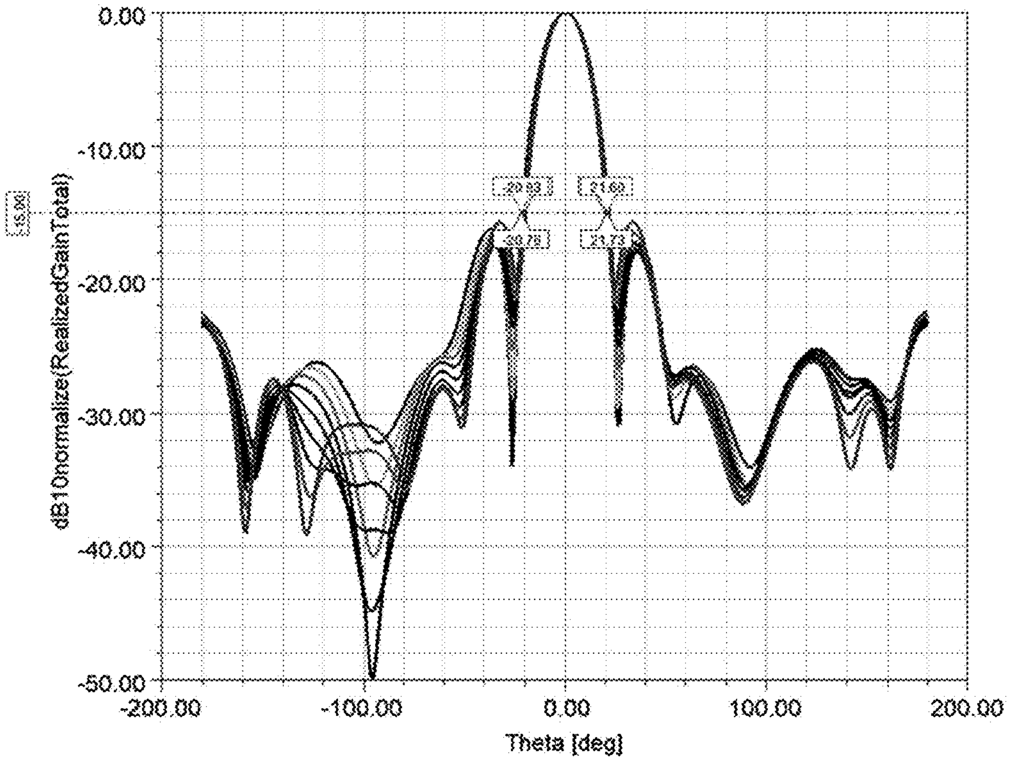
FIG. 21 is a side lobe and back lobe plot of the antenna in FIG. 1 at 2.25 GHz to 2.45 GHz.

FIG. 21 is a side lobe and back lobe plot of the antenna in FIG. 1 at 2.25 GHz to 2.45 GHz. As shown in FIG. 21, it can be seen that the antenna has excellent radiation characteristics, with an antenna side lobe less than 15 dB and a back lobe less than 23 dB.

Figure 22:
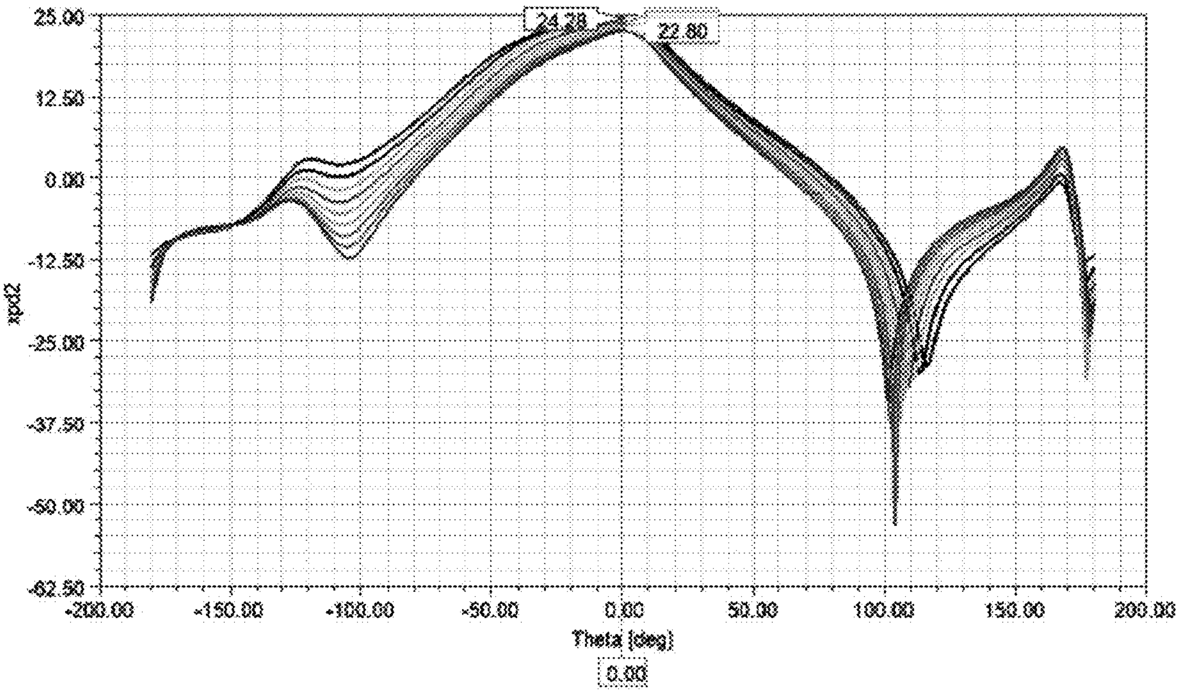
FIG. 22 is a cross-polarization ratio plot of the antenna in FIG. 1 at 2.25 GHz to 2.45 GHz.

FIG. 22 is a cross-polarization ratio plot of the antenna in FIG. 1 at 2.25 GHz to 2.45 GHz. As shown in FIG. 22, it can be seen that the antenna has an excellent cross-polarization ratio, with an axial cross-polarization ratio greater than 22.

In a second aspect, an embodiment of the present disclosure provides an electronic device, including any antenna as described above.

In some examples, the antenna further includes a transceiver unit, a radio frequency transceiver, a signal amplifier, a power amplifier, and a filter unit. The antenna may be used as a transmitting antenna or a receiving antenna in a communication device. The transceiver unit may include a baseband and a receiving end. The baseband provides signals of at least one frequency band, for example, 2G signals, 3G signals, 4G signals, 5G signals, or the like, and transmits the signals of the at least one frequency band to the radio frequency transceiver. After being received by the antenna in the communication system, the signals may be processed by the filter unit, the power amplifier, the signal amplifier, and the radio frequency transceiver, and then transmitted to the receiving end in the transceiver unit. The receiving end may be, for example, an intelligent gateway, or the like.

Further, the radio frequency transceiver is connected to the transceiver unit, and configured to modulate a signal sent from the transceiver unit, or demodulate a signal received by the antenna and transmit the demodulated signal to the transceiver unit. Specifically, the radio frequency transceiver may include a transmitting circuit, a receiving circuit, a modulation circuit, and a demodulation circuit. After being received by the transmitting circuit, multiple types of signals provided by the baseband can be modulated by the modulation circuit and then transmitted to the antenna. Then, the antenna receives and transmits the signals to the receiving circuit of the radio frequency transceiver which further transmits the signals to the demodulation circuit, where the signals are demodulated by the demodulation circuit and then transmitted to the receiving end.

Further, the radio frequency transceiver is connected to the signal amplifier and the power amplifier which are further connected to the filter unit, and the filter unit is connected to at least one antenna. In the process of transmitting signals by a communication system, the signal amplifier is configured to increase signal-to-noise ratio of signals output from the radio frequency transceiver, and then transmit the signals to the filter unit. The power amplifier is configured to amplify power of the signals output from the radio frequency transceiver, and then to transmit the signals to the filter unit. The filter unit may specifically include a duplexer and a filter circuit. The filter unit combines the signals output from the signal amplifier and the power amplifier, filters noise waves, and then transmits the signals to the antenna to be radiated. In the process of receiving signals by a communication system, after being received by the antenna, the signals are transmitted to the filter unit, where the signals received by the antenna are filtered to remove noise waves by the filter unit and then transmitted to the signal amplifier and the power amplifier. The signal amplifier increases a gain of the signals received by the antenna to increase a signal-to-noise ratio of the signals; while the power amplifier amplifies a power of the signals received by the antenna. After being processed by the power amplifier and the signal amplifier, the signals received by the antenna are transmitted to the radio frequency transceiver, and then to the transceiver unit.

In some examples, the signal amplifier may include various types of signal amplifiers, such as a low noise amplifier, which is not limited herein.

In some examples, the antenna provided in the embodiments of the present disclosure further includes a power management unit, which is connected to the power amplifier and provides a voltage for signal amplification for the power amplifier.

It will be appreciated that the above implementations are merely exemplary implementations for the purpose of illustrating the principle of the present disclosure, and the present disclosure is not limited thereto. It will be apparent to one of ordinary skill in the art that various modifications and variations may be made without departing from the spirit or essence of the present disclosure. Such modifications and variations should also be considered as falling into the protection scope of the present disclosure.

What is claimed is:

1. An antenna, comprising a first substrate and a second substrate; wherein the first substrate comprises:

a first dielectric substrate comprising a main substrate and a side substrate, wherein the main substrate has a first surface and a second surface opposite to each other in a thickness direction of the main substrate, and the side substrate comprises a third surface and a fourth surface opposite to each other in a thickness direction of the side substrate; and the second surface of the main substrate is connected to the third surface of the side substrate, and the side substrate protrudes out of the second surface of the main substrate;

a first reference electrode layer on the first surface and the fourth surface;

at least one first radiation part on the second surface; and at least one feeder group comprising at least one feeder, wherein the feeder is provided on the second surface and extends toward the third surface, each feeder in each feeder group is electrically connected to one first radiation part, and different feeders in the feeder group are electrically connected to different first radiation parts; and the second substrate comprises:

a second dielectric substrate having a fifth surface and a sixth surface opposite to each other in a thickness direction of the second dielectric substrate; wherein the fifth surface is opposite to the fourth surface;

a second reference electrode layer on the fifth surface; and at least one feed structure on the sixth surface, wherein the feed structure corresponds to the feeder group, and for the corresponding feed structure and feeder group, each first feed port in the feed structure is electrically connected to one feeder in the feeder group through a first connection via; and the first connection via runs through at least the side substrate, the second reference electrode layer, and the second dielectric substrate.

2. The antenna according to claim 1, wherein the first reference electrode layer comprises a first reference sub-electrode and a second reference sub-electrode connected to each other, the first reference sub-electrode is on the first surface, and the second reference sub-electrode is on the fourth surface;

the second reference sub-electrode is electrically connected to the second reference electrode layer; and the antenna further comprises:

at least one first opening running through the second reference sub-electrode and the second reference electrode layer;

at least one first connection electrode on the fifth surface, wherein each first connection electrode is in one first opening, and a second feed port of one feed structure is electrically connected to the first connection electrode through a second connection via; and the second connection via runs through at least the second dielectric substrate; and at least one radio frequency line, a core of each of which is electrically connected to the first connection electrode through a third connection via; wherein the third connection via runs through at least the second dielectric substrate.

3. The antenna according to claim 2, further comprising:

at least one second connection electrode on the sixth surface and electrically connected to the second reference electrode layer through a fourth connection via running through the second dielectric substrate; wherein the third connection via further runs through the second connection electrode, and a reference electrode layer of the radio frequency line is electrically connected to the second connection electrode.

4. The antenna according to claim 3, wherein the second connection via and the third connection via each further run through the first connection electrode, the first connection electrode is welded to the second feed port of the feed structure through the second connection via, and a core of the radio frequency line is welded to the first connection electrode through the third connection via.

5. The antenna according to claim 2, further comprising a second opening running through the side substrate, wherein an orthographic projection of the second opening on a plane where the second dielectric substrate is located covers an orthographic projection of the first opening on the plane where the second dielectric substrate is located.

6. The antenna according to claim 1, wherein the first feed port is riveted or welded with the feeder by a connector through the first connection via.

7. The antenna according to claim 1, wherein the at least one feeder group comprises a first feeder group and a second feeder group; a plurality of first feeders are provided in the first feeder group, and a plurality of second feeders are provided in the second feeder group; the at least one feed structure comprises a first feed structure and a second feed structure; the first feed structure and the second feed structure each comprise a plurality of first feed ports and one second feed port, each of the first feed ports in the first feed structure is electrically connected to one of the first feeders, and each of the first feed ports in the second feed structure is electrically connected to one of the second feeders.

8. The antenna according to claim 1, further comprising: at least one director on the second surface and in one-to-one correspondence with the first radiation part, wherein the director is on a side of the corresponding first radiation part away from the side substrate.

9. The antenna according to claim 1, further comprising:

a third dielectric substrate having a seventh surface and an eighth surface opposite to each other in a thickness direction of the third dielectric substrate, wherein the seventh surface is opposite to, and spaced by a spacing from, the second surface; and at least one second radiation part on the seventh surface or the eighth surface, wherein orthographic projections of each second radiation part and one corresponding first radiation part on the first surface are at least partially overlapped.

10. The antenna according to claim 9, further comprising:

a plurality of support components between the second surface and the seventh surface to provide a spacing between the first radiation part and the second radiation part.

11. The antenna according to claim 10, wherein each support component is a height-adjustable support component to adjust the spacing between the first radiation part and the second radiation part.

12. The antenna according to claim 9, further comprising:

a radome, wherein two opposite side walls of the radome are provided with a plurality of sets of slide rails; and the main substrate and the third dielectric substrate are insertable into different sets of slide rails.

13. The antenna according to claim 9, further comprising: a radome comprising a first base material and a second base material opposite to each other; wherein the first dielectric substrate with the first reference electrode layer is on a side of the first base material close to the second base material; and the third dielectric substrate with the second radiation part is on a side of the second base material close to the first base material.

14. The antenna according to claim 9, wherein at least one of the first radiation part, the second radiation part, the first reference electrode layer, or the feeder comprises a metal mesh.

15. The antenna according to claim 14, wherein the metal mesh has a line width in a range of 2 μm to 30 μm, a line spacing in a range of 50 μm to 250 μm, and a line thickness in a range of 1 μm to 10 μm.

16. The antenna according to claim 9, wherein the third dielectric substrate comprises any one of polycarbonate plastic, cyclic olefin polymer plastic, or polymethyl methacrylate.

17. The antenna according to claim 1, wherein the first dielectric substrate comprises any one of polycarbonate plastic, cyclic olefin polymer plastic, or polymethyl methacrylate.

18. The antenna according to claim 1, wherein the second substrate is a printed circuit board.

19. The antenna according to claim 1, wherein the main substrate and the side substrate form an integral structure.

20. An electronic device, comprising the antenna according to claim 1.

* * * * *